(No Model.)
P. S. KEELE.
AGRICULTURAL IMPLEMENT.
No. 282,644. Patented Aug. 7, 1883.
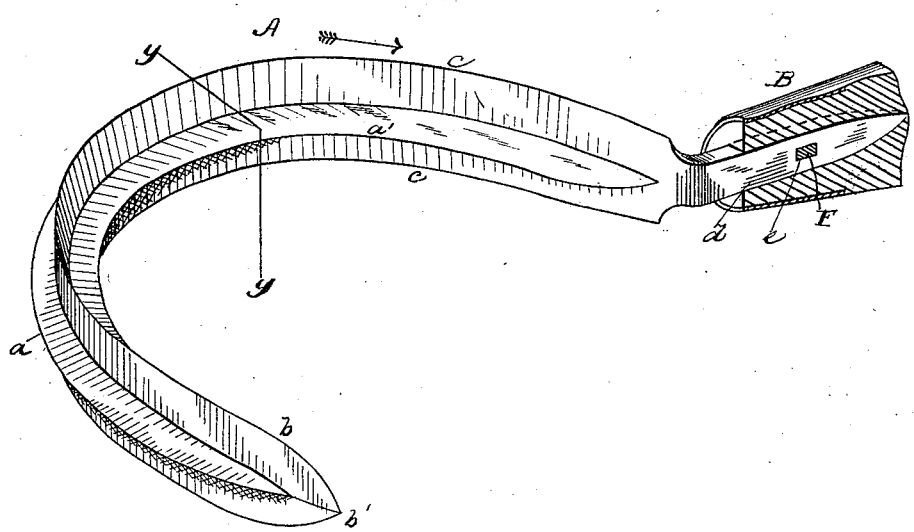
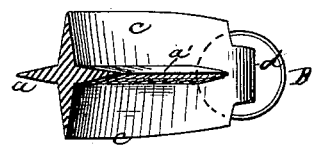
Attest,
W. H. H. Knight
W. Bernhard
Inventor,
Peyton S. Keele
By Eclsen Bros.
Attorneys

UNITED STATES PATENT OFFICE.

PEYTON S. KEELE, OF SUMMERSVILLE, MISSOURI.

AGRICULTURAL IMPLEMENT.

SPECIFICATION forming part of Letters Patent No. 282,644, dated August 7, 1883.

Application filed June 4, 1883. (No model.)

*To all whom it may concern:*

Be it known that I, PEYTON S. KEELE, a citizen of the United States, residing at Summersville, in the county of Texas and State of Missouri, have invented certain new and useful Improvements in Agricultural Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to an improvement in gardening implements, having for its object to cultivate particularly garden vegetables, to thin out or remove grass and weeds from cotton and other plants, and to serve as a pick or hoe, as well as to cut grass alone; and it consists of a double-edged hook-shaped blade with one knife-edge on its convex surface and a second knife-edge on its concavity, while its point is adapted to cut the ground, after the manner of a hoe or pick, and along its sides extend strengthening or re-enforcing ribs, all substantially as hereinafter more fully set forth and claimed.

In the accompanying drawings, Figure 1 is a perspective view of my improved gardening or agricultural implement, with the handle partly sectioned, exposing the tang end of the blade. Fig. 2 is a cross-section of the blade.

In carrying out my invention, I construct the same of a blade, A, and a handle, B. The blade A is made hook-shaped, the curvature thereof resembling the shape of the ordinary grass hook or sickle. This blade is provided on its convexity with a knife-edge, $a$, and on its concavity with a knife-edge, $a'$, which extend along nearly its entire length, being thickest at about the middle of the blade and tapering toward and terminating flush with the forward end of the blade, or rather at a point $a$ short distance inward from said forward end. The forward end of the blade is somewhat broadened, as at $b$, and made with an approximately pick or hoe shaped edge, as at $b'$, the purpose of which is to enable the implement to be used as a hoe or pick or plow to loosen and break the earth and to cultivate the plants—cotton and other plants—and vegetables, while by means of the knife-edges $a$ $a'$ the instrument is adapted to be used to cut or thin out the weeds or grass around the plants or vegetables, the knife-edge $a$ on its convexity rendering it capable of cutting close up to the plants or vegetables, where the knife-edge $a'$ on its concavity could not be so expeditiously and conveniently used. The latter edge of the implement adapts the same more particularly as a grass hook or sickle, while it also serves to cut the weeds and grass more distant from the plants or vegetables than that effected by the knife-edge $a$ on the convexity of the implement. These knife-edges, being made, of course, light and comparatively thin to render them effective for their intended purpose, are strengthened or re-enforced by providing the implement with laterally-extended ribs or webs $c$, arranged at about the middle of the implement, or at the point where the knife-edges stand back to back, and extending from end to end of the implement, with their inner surfaces flared and merged into the sides of the knife-edges $a$ $a'$. The tang end $d$ of the blade or implement A is provided with an eye, $e$, and fits into a socket of the handle B, suitably ferruled, and through which and the eye $e$ of the tang $d$ is passed a pin or key, $f$, to secure the handle and blade together.

It will be further observed that this invention can be also used for scraping and pulverizing the loosened earth.

Having thus fully described my invention, I claim and desire to secure by Letters Patent—

1. The agricultural implement consisting of the blade A, provided with the knife-edge $a$ on its convexity, and with the knife-edge $a'$ on its concavity, the forward end of said implement or blade being broadened and shaped at its cutting-edge as set forth.

2. In an agricultural implement, the blade A, provided on its convexity with a knife-edge, $a$, and on its concavity with a knife-edge, $a'$, and re-enforced by means of lateral ribs or webs $c$, the forward end of said blade being broadened and shaped as set forth, in combination with the handle B and key $f$, inserted through said handle, and an eye, $e$, of the tang $d$ of the blade A, substantially as and for the purpose described.

In testimony whereof I affix my signature in presence of two witnesses.

PEYTON S. KEELE.

Witnesses:
JAMES A. FARLEY,
JOHN D. YOUNG.